United States Patent
Tsukano et al.

(10) Patent No.: US 7,412,858 B2
(45) Date of Patent: Aug. 19, 2008

(54) ELECTRIC STEERING LOCK DEVICE

(75) Inventors: Tetsuyuki Tsukano, Kanagawa-ken (JP); Koichiro Sugimoto, Kanagawa-ken (JP)

(73) Assignee: Alpha Corporation, Yokohama-Shi (JP)

( * ) Notice: Subject to any disclaimer, the term of this patent is extended or adjusted under 35 U.S.C. 154(b) by 0 days.

(21) Appl. No.: 11/579,696

(22) PCT Filed: Sep. 20, 2005

(86) PCT No.: PCT/JP2005/017255

§ 371 (c)(1),
(2), (4) Date: Nov. 6, 2006

(87) PCT Pub. No.: WO2006/046366

PCT Pub. Date: May 4, 2006

(65) Prior Publication Data

US 2007/0214846 A1    Sep. 20, 2007

(30) Foreign Application Priority Data

Oct. 29, 2004  (JP) .............................. 2004-315850

(51) Int. Cl.
*B60R 25/02* (2006.01)
(52) U.S. Cl. .............................. 70/186; 70/252; 70/386
(58) Field of Classification Search ........... 70/182–186, 70/252, 386
See application file for complete search history.

(56) References Cited

U.S. PATENT DOCUMENTS

| | | | | | |
|---|---|---|---|---|---|
| 3,673,829 A | * | 7/1972 | Mizuno | ....................... | 70/252 |
| 4,248,070 A | * | 2/1981 | Eichenauer | .................... | 70/252 |
| 4,487,042 A | * | 12/1984 | Mochida et al. | ................ | 70/186 |
| 4,643,009 A | * | 2/1987 | Sato | ............................. | 70/252 |
| 5,092,147 A | * | 3/1992 | Mochida et al. | ................ | 70/252 |
| 5,291,067 A | * | 3/1994 | Nakajima et al. | ............. | 307/9.1 |
| 5,634,358 A | * | 6/1997 | Myers | ........................ | 70/233 |
| 5,656,867 A | * | 8/1997 | Kokubu | ..................... | 307/10.5 |
| 6,508,088 B1 | * | 1/2003 | Barbier et al. | ................ | 70/186 |

FOREIGN PATENT DOCUMENTS

| | | |
|---|---|---|
| DE | 26 37 850 A1 | 4/1978 |
| DE | 101 21 919 C1 | 11/2002 |
| GB | 1143964 | 2/1969 |
| JP | 8-282442 | 10/1996 |
| JP | 2000-154674 A | 6/2000 |
| JP | 2002-234419 A | 8/2002 |

* cited by examiner

*Primary Examiner*—Lloyd A Gall
(74) *Attorney, Agent, or Firm*—Nath Law Group; Jerald L. Meyer; Sung Yeop Chung

(57) ABSTRACT

There are provided a cam plate (5) that rotates in an unlocking direction and a locking direction, and a locking shaft (8) that moves between a locking position where rotation of a steering shaft is prevented and an unlocking position where the rotation of the steering shaft is permitted by rotation of the cam plate (5). The cam plate (5) is provided with a steering lock preventing unit (20) through a spring (22). The steering lock preventing unit (20) holds the locking shaft (8) in the unlocking position. A ball (23) moves on a moving surface (24) of a motor unit (4) opposed to the cam plate (5) by rotation of the cam plate (5). A projecting wall (25) is provided on the moving surface (24) at a position before the unlocking position in a range where the ball (23) moves from the locking position to the unlocking position.

5 Claims, 10 Drawing Sheets

ELECTRIC STEERING LOCK DEVICE

TECHNICAL FIELD

The present invention relates to an electric steering locking apparatus that locks a steering shaft of an automobile.

BACKGROUND ART

Japanese Patent Application Laid-Open No. 2000-154674 discloses a conventional electric steering locking apparatus of this kind. This electric steering locking apparatus mainly includes a cam member that rotates in an unlocking direction and a locking direction by driving operation of a drive source, a locking member that follows a sliding surface of the cam member and moves between a locking position where the rotation of a steering shaft is locked and an unlocking position where the rotation of the steering shaft is permitted, a spring that biases the locking member toward the locking position, and a steering lock preventing unit that holds the locking member in the unlocking position.

The steering lock preventing unit includes a holding lever connected to an operation knob through a connection member. When the holding lever enters an engaging groove of the locking member located in the unlocking position, the locking member is locked.

With the above configuration, while a vehicle is parked, the locking member is located in the locking position and the steering shaft is locked. Thus, the vehicle can be theftproof during parking.

When a parked vehicle is to be driven, the cam member rotates in the unlocking direction by the driving operation of the drive source, the locking member is brought into the unlocking position, and the rotation of the steering shaft is permitted. When the locking member is located in the unlocking position, the holding lever of the steering lock preventing unit enters into the engaging groove of the locking member, and the locking member is locked so as not to move to the locking position. With this configuration, even when an external force toward the locking position is applied to the cam member or the locking member due to abrupt vibration or the like during running, it is possible to prevent the locking member biased by the spring from moving toward the locking position to lock the steering shaft.

DISCLOSURE OF THE INVENTION

The steering lock preventing unit of the conventional electric steering locking apparatus is mechanically associated with the operation knob. Therefore, there is a problem that the configuration is complicated, installation space is large, and cost is high. There is also a problem that a striking sound caused when the holding lever enters the engaging groove of the locking member is loud.

Another conventional steering lock preventing unit includes an electromagnetic solenoid which is turned ON and OFF in association with an operation position of the operation knob, and an engaging plate which is moved by the electromagnetic solenoid and which is engaged with and disengaged from the engaging groove of the locking member. However, even with the electromagnetic solenoid, the same problem as the former conventional technique arises.

It is an object of the invention to provide an electric steering locking apparatus in which a configuration thereof is simple, installation space is small, cost is low, and a striking sound caused when the locking member in an unlocking position is locked is small.

To achieve the above object, according to an aspect of the present invention, there is provided an electric steering locking apparatus including a cam member that rotates in an unlocking direction and a locking direction by driving operation of a drive source, a locking member that moves between a locking position where a steering shaft is prevented from rotating and an unlocking position where the steering shaft is permitted to rotate by rotation of the cam member, and a steering lock preventing unit that holds the locking member in the unlocking position, wherein the steering lock preventing unit includes a moving member which is provided on one of the cam member and a member opposed to the cam member and which is moved by rotation of the cam member, and a resisting unit which is provided on the other member, and which increases a moving resistance when the moving member moves from the unlocking position to the locking position on a moving locus of the moving member.

With this configuration, since it is only necessary that the cam member and the member opposed thereto are provided with the moving member, the resisting unit, and the like the configuration can be simplified, the installation space is reduced, and the cost can be reduced. The moving member moves on the opposed member by rotation of the cam member and the locking member is locked in the unlocking position by the moving resistance. Thus, almost no striking sound is generated when the locking member is locked in the unlocking position.

The moving member may be a ball biased toward the opposed member by a biasing unit. With this configuration, since the ball moves on the opposed member, wear of the moving surface can be prevented as much as possible.

The resisting unit may be a projecting wall provided at a position immediately before the unlocking position on a sliding locus. The resisting unit may be a groove formed in the unlocking position on the sliding locus.

BEST MODE FOR CARRYING OUT THE INVENTION

An embodiment of the present invention will be explained below with reference to the drawings.

Figure 1:
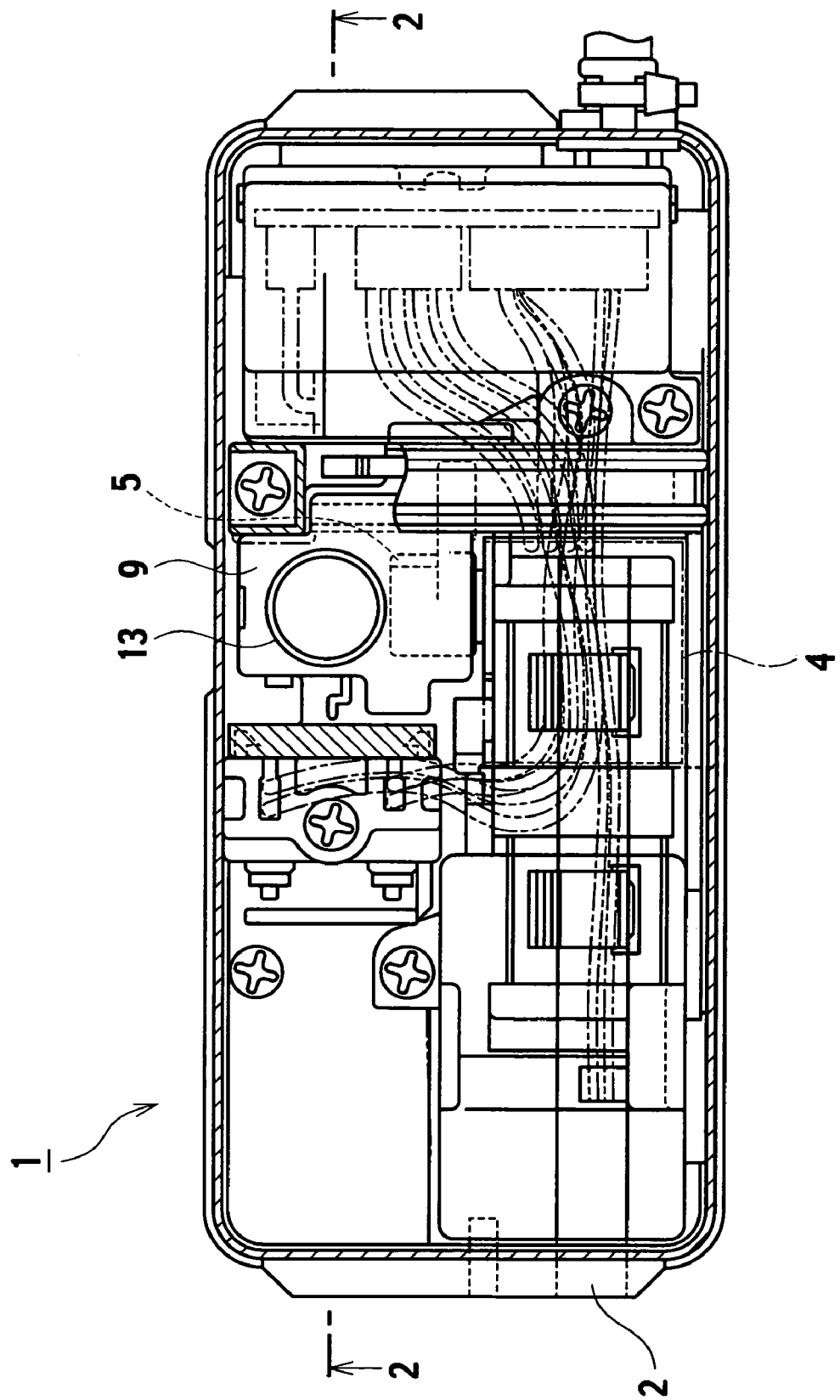
FIG. 1 is a plan view of an electric steering locking apparatus according to an embodiment of the present invention.
Figure 2:
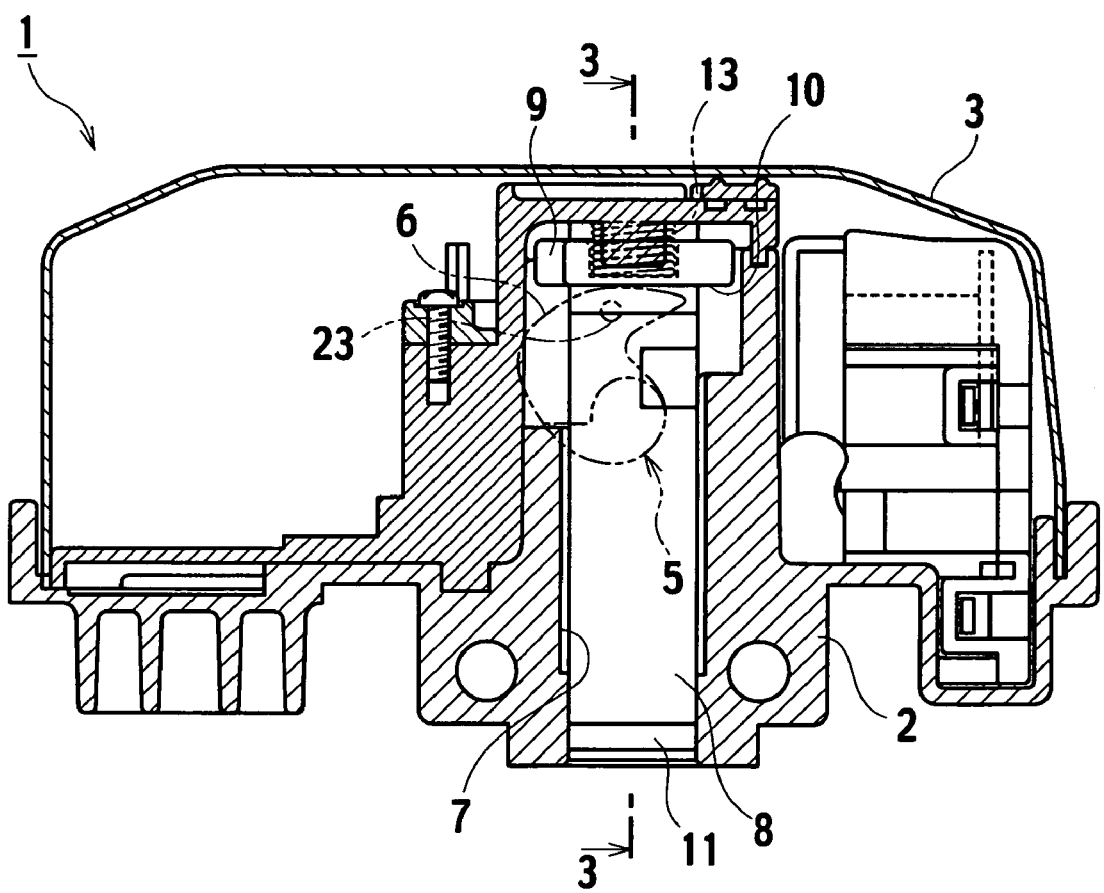
FIG. 2 is a cross section taken along line 2-2 in FIG. 1 when a locking shaft is in an unlocking position according to the embodiment of the invention.
Figure 4:
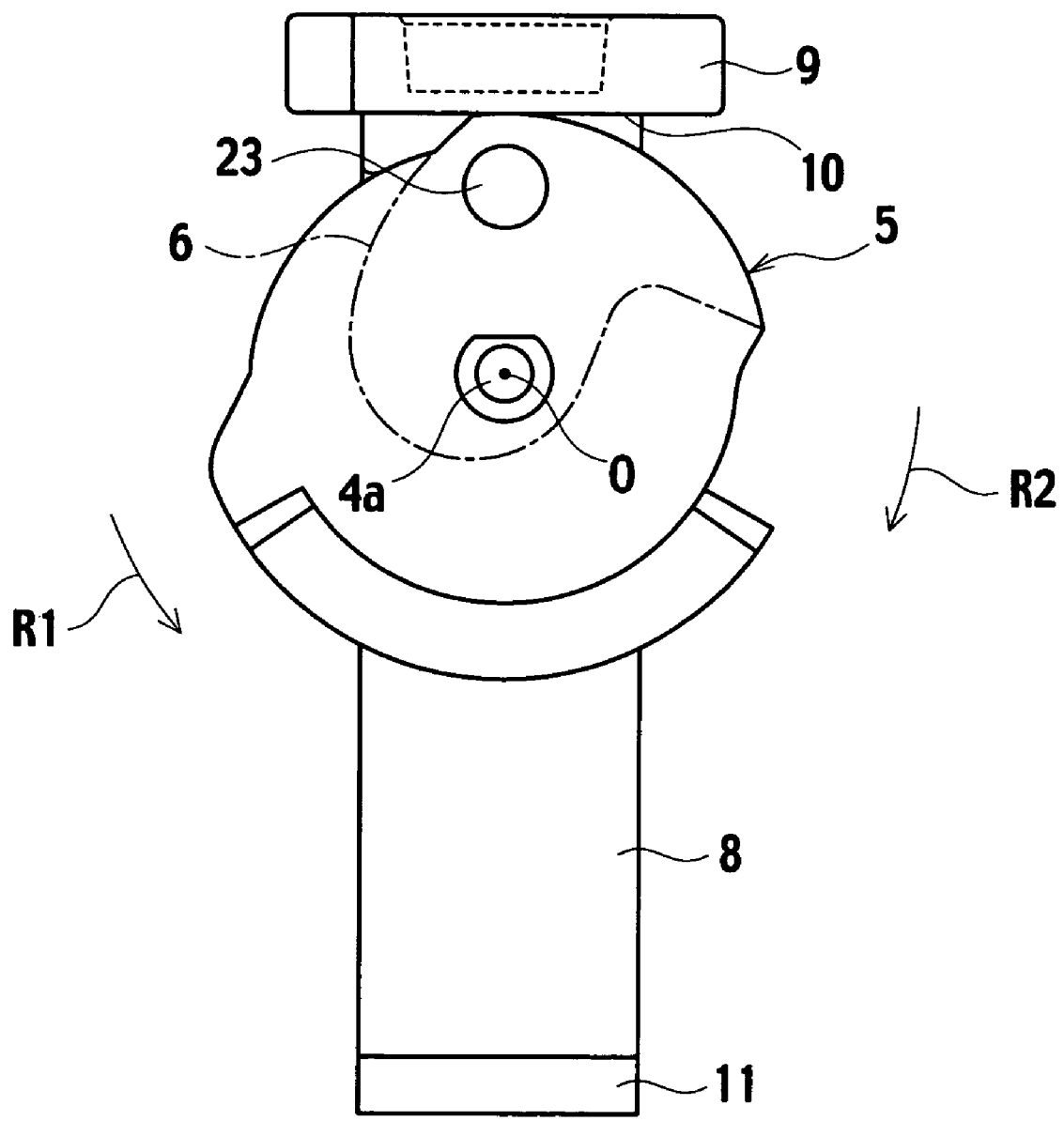
FIG. 4 is a schematic enlarged view showing a layout of the locking shaft and a cam plate in an unlocking position according to the embodiment of the invention.
Figure 7:
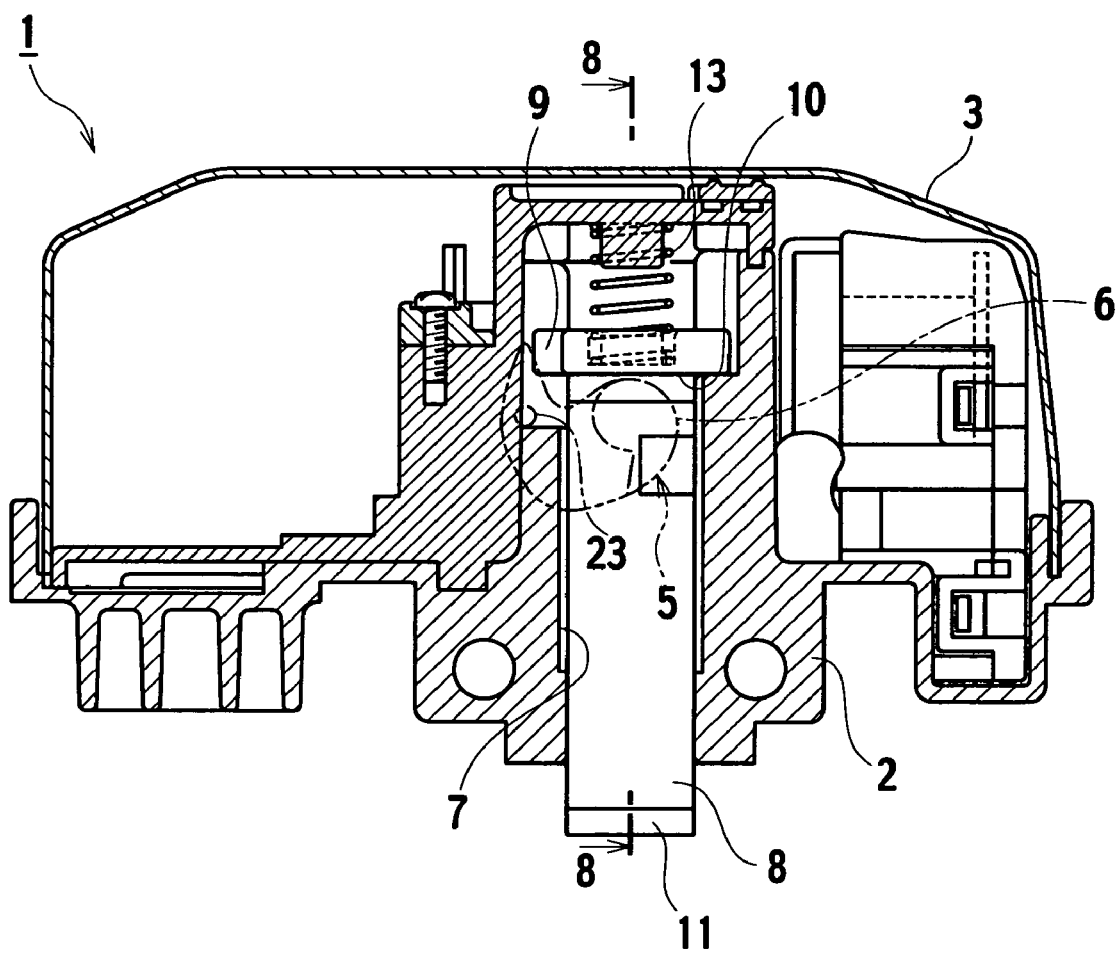
FIG. 7 is a cross section taken along line 2-2 in FIG. 1 when the locking shaft is in a locking position according to the embodiment of the invention.

As shown in FIGS. 1, 2, and 7, an electric steering locking apparatus 1 includes a frame 2 and a cover 3 that covers an upper portion of the frame 2. A motor unit 4 which is a drive source is fixed on the frame 2 covered with the cover 3. The motor unit 4 includes a speed reduction mechanism therein, and a cam plate 5 which is a cam member is fixed to a rotation shaft 4a (shown in FIGS. 4 and 5) projecting from a unit case.

The cam plate 5 is rotated in an unlocking direction R1 and its opposite locking direction R2 by rotation of the rotation shaft 4a. An outer peripheral surface of the cam plate 5 is formed as a sliding surface 6. The sliding surface 6 is set such that a distance from a rotation center O to the sliding surface 6 is gradually varied as a rotation angle is varied. A distance to a contact position where the locking shaft 8 is brought to the locking position is set to be the shortest distance, and a distance to a contact position where the locking shaft 8 is brought to the unlocking position is set to be the longest distance.

The frame 2 is formed with a sliding hole 7 penetrating the frame 2 in a vertical direction. The locking shaft 8 which is a locking member is movably disposed in the sliding hole 7. A hanger portion 9 is fixed to an upper end of the locking shaft 8. A lower surface of the hanger portion 9 is formed as a cam abutment surface 10. The cam abutment surface 10 abuts against the sliding surface 6 of the cam plate 5. Spring force of a spring 13 is applied to an upper surface of the hanger portion 9. The locking shaft 8 is biased toward the locking position by the spring force and the cam abutment surface 10 is pushed by the cam plate 5.

Figure 3:
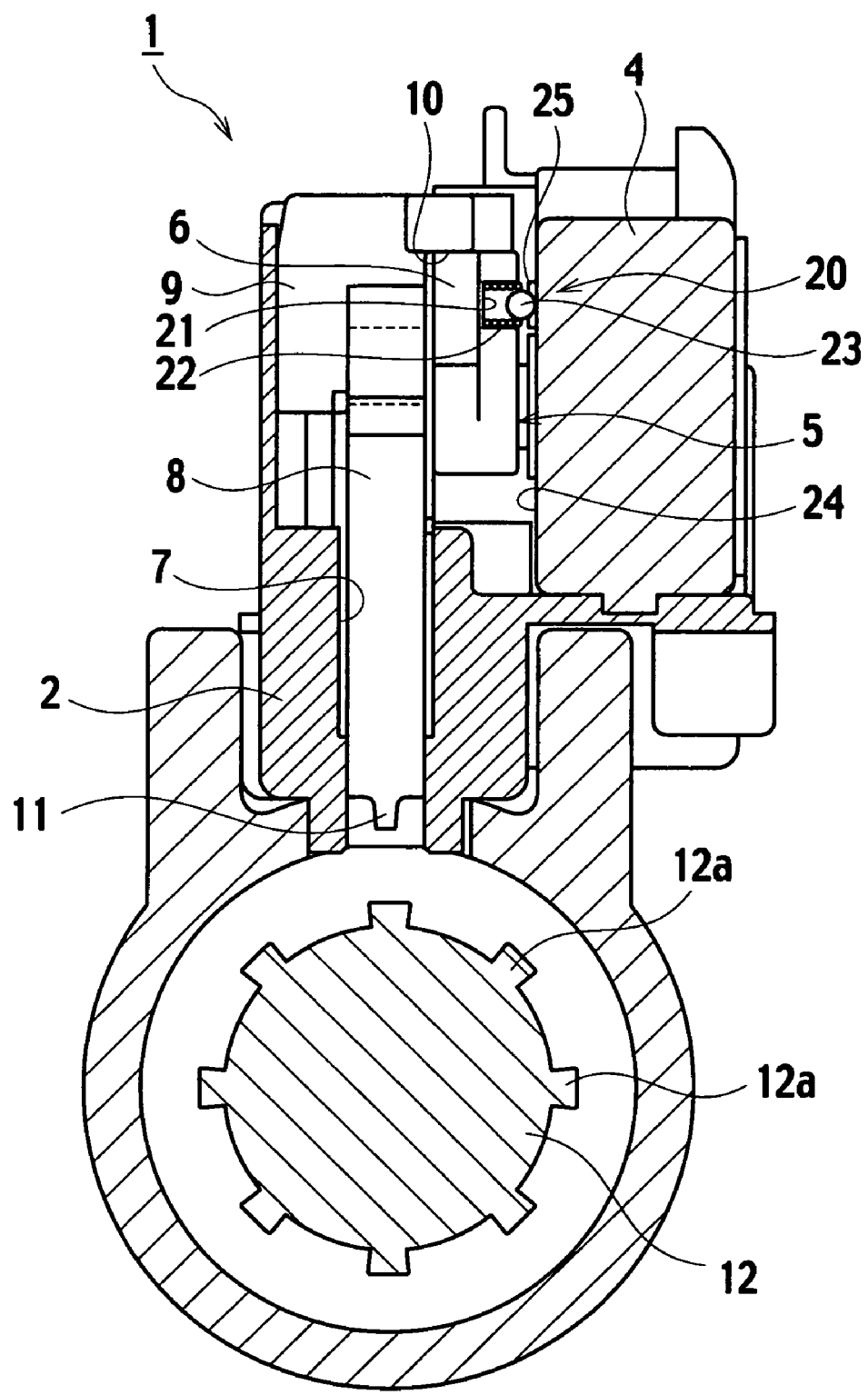
FIG. 3 is a cross section taken along line 3-3 in FIG. 2 according to the embodiment of the invention.

The locking shaft 8 is provided at its lower end with an engaging pin portion 11. The locking shaft 8 moves by following the sliding surface 6 of the cam plate 5, and moves between a locking position shown in FIGS. 7 and 8 and an unlocking position shown in FIGS. 2 to 4. In the locking position, the engaging pin portion 11 enters between projections 12a of a steering shaft 12 (state shown in FIG. 8), thereby preventing rotation of the steering shaft 12. In the unlocking position, the engaging pin portion 11 is located out of rotation locus of the projections 12a of the steering shaft 12 (state shown in FIG. 3), thereby permitting the rotation of the steering shaft 12.

As shown in FIGS. 3 to 6 and 8, the electric steering locking apparatus 1 includes a steering lock preventing unit 20. The steering lock preventing unit 20 includes a spring 22 which is a biasing unit disposed in a recess 21 formed in a side surface of the cam plate 5, a ball 23 which is a moving member supported on a tip end of the spring 22, and a projecting wall 25 which is a resisting unit projecting on a stationary surface 24 of the ball 23. The stationary surface 24 is a side surface of the motor unit 4 which is a member opposed to a side surface of the cam plate 5. The projecting wall 25 is disposed immediately before the unlocking position in a range where the ball 23 moves from the locking position to the unlocking position.

Figure 5:
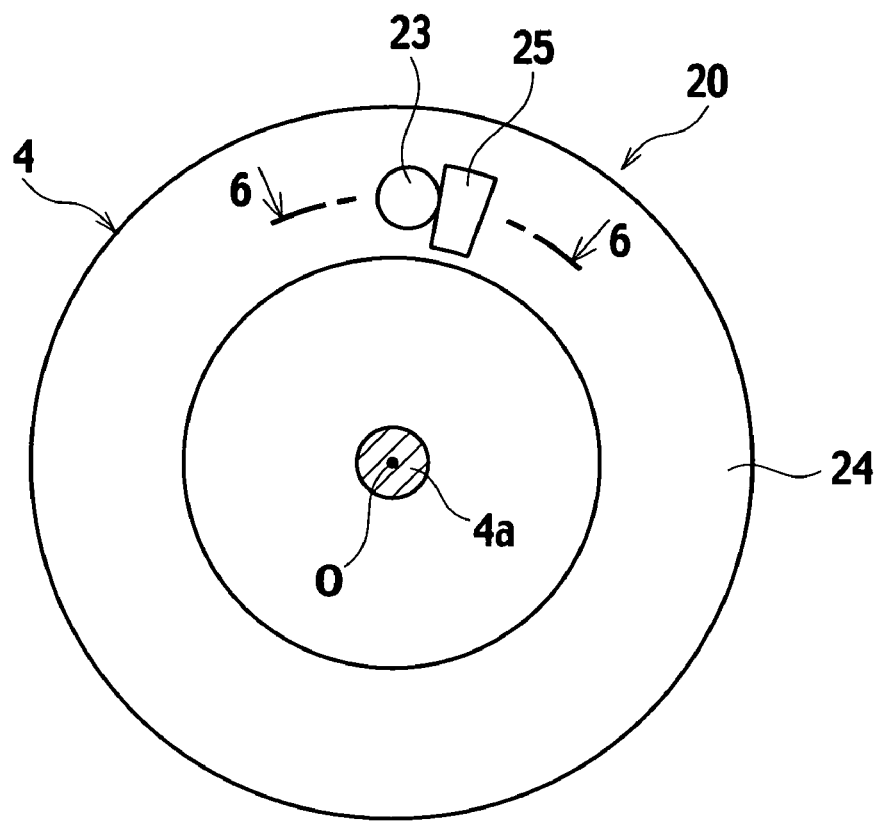
FIG. 5 shows a steering lock preventing unit according to the embodiment of the invention.
Figure 6:
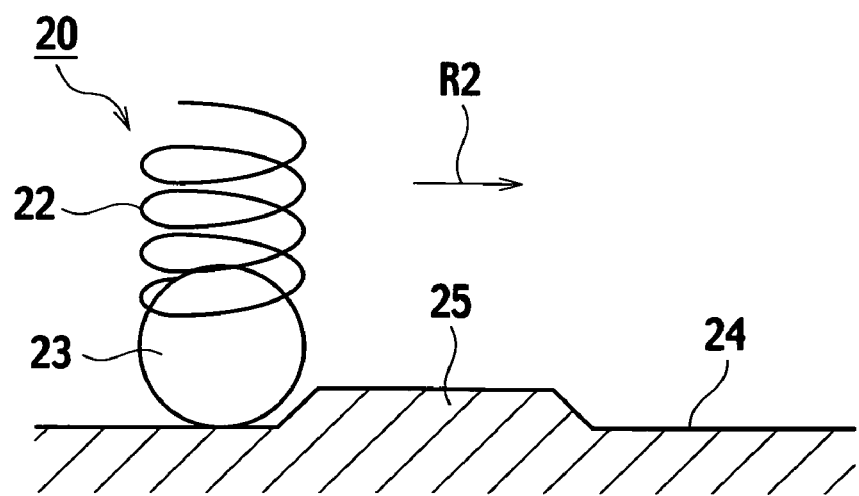
FIG. 6 is an enlarged cross section taken along line 6-6 in FIG. 5 according to the embodiment of the invention.

When the cam plate 5 rotates, the ball 23 moves on the stationary surface 24. At the position of the projecting wall 25, the ball 23 retreats into the recess 21 against the spring force of the spring 22 and crosses over the projecting wall 25. In the unlocking position of the locking shaft 8, as shown in FIGS. 5 and 6, the ball 23 is located at a position where the ball 23 crosses over the projecting wall 25, and the locking shaft 8 is held at the unlocking position by the moving resistant force. To move the cam plate 5 toward the locking position from the unlocking position, the cam plate 5 can rotate only when a large driving force of the motor unit 4 is applied.

Figure 8:
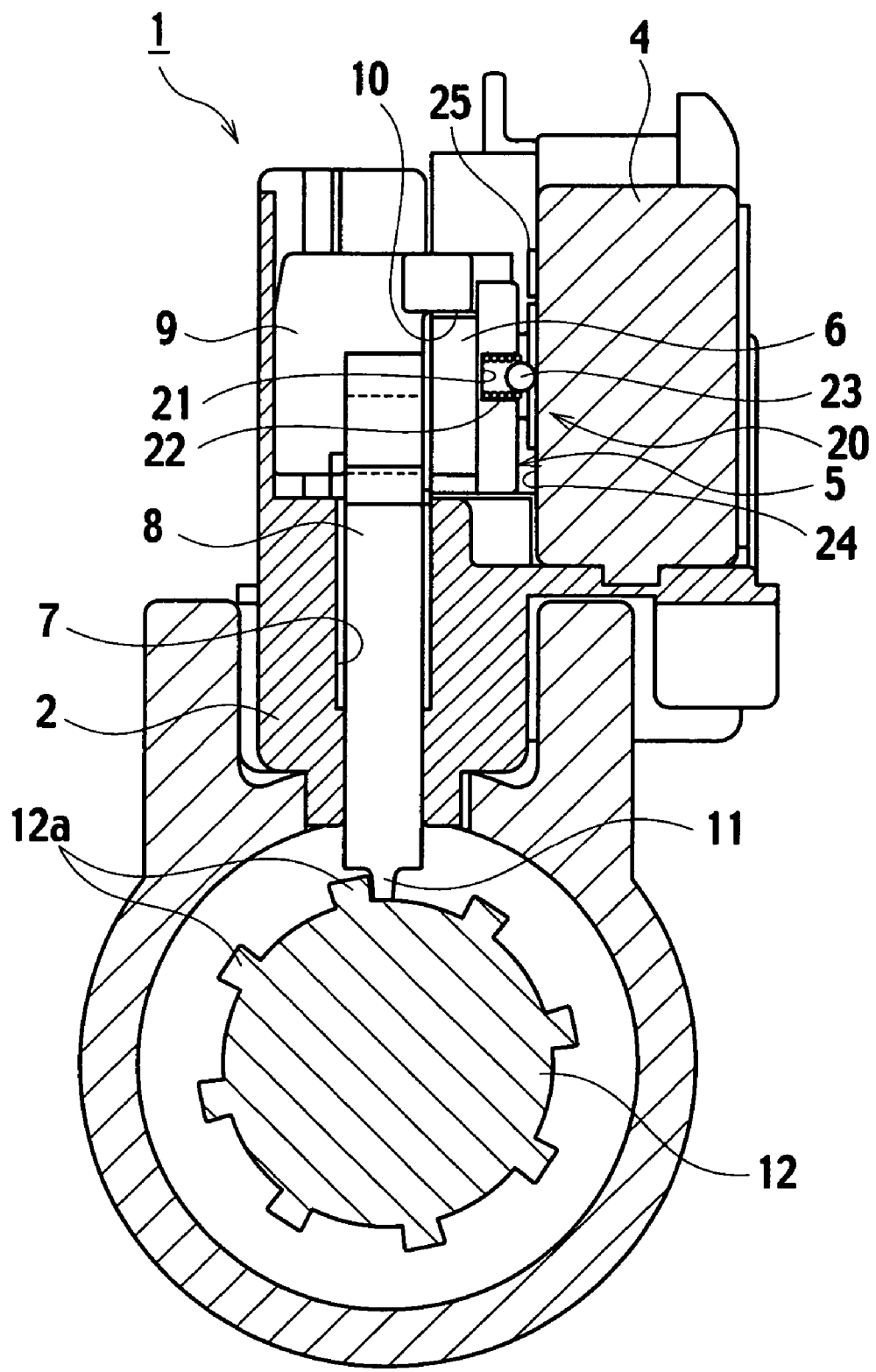
FIG. 8 is a cross section taken along line 8-8 in FIG. 7 according to the embodiment of the invention.

With the above configuration, while the vehicle is parked, the locking shaft 8 is located in the locking position shown in FIGS. 7 and 8, and the rotation of the steering shaft 12 is locked. Thus, the vehicle can be theftproof.

If a driver carries out a predetermined operation to start an engine, the motor unit 4 is driven and the cam plate 5 is rotated to the unlocking direction R1. With this, the locking shaft 8 moves to the unlocking position shown in FIGS. 2 to 5, and the steering shaft 12 is permitted to rotate. The ball 23 moves on the moving surface 24 of the motor unit 4 together with rotation of the cam plate 5, and in the unlocking position of the locking shaft 8, the ball 23 moves to and stops at a position where the ball 23 crosses over the projecting wall 25. Even when an external force toward the locking position is applied to the cam plate 5 or the locking shaft 8 due to abrupt vibration or the like during running, the cam plate 5 is prevented from moving toward the locking position by a great moving resistance caused by the ball 23 and the projecting wall 25. The locking force of the steering lock preventing unit 20 prevents the locking shaft 8 from locking the steering shaft 12.

Next, if the driver carries out a predetermined operation to park the vehicle, the motor unit 4 is driven to rotate the cam plate 5 to the locking direction R2. Then, the ball 23 crosses over the projecting wall 25 by the rotation force of the cam plate 5 and the cam plate 5 is permitted to rotate in the locking direction R2. When the ball 23 crosses over the projecting wall 25, the locked state by the steering lock preventing unit 20 is released. By the rotation of the cam plate 5, the locking shaft 8 moves in the locking position shown in FIGS. 7 and 8, and the steering shaft 12 is prevented from rotating.

According to the steering lock preventing unit 20 of the electric steering locking apparatus 1, since it is only necessary that the cam plate 5 and the motor unit 4 opposed thereto are provided with the ball 23, the projecting wall 25, and the like, the configuration can be simplified, the installation space is reduced, and the cost can be reduced. Since the locking shaft 8 is locked in the unlocking position when the ball 23 moves on the moving surface 24, almost no striking sound is generated when the locking shaft 8 is locked in the unlocking position.

Figure 9:
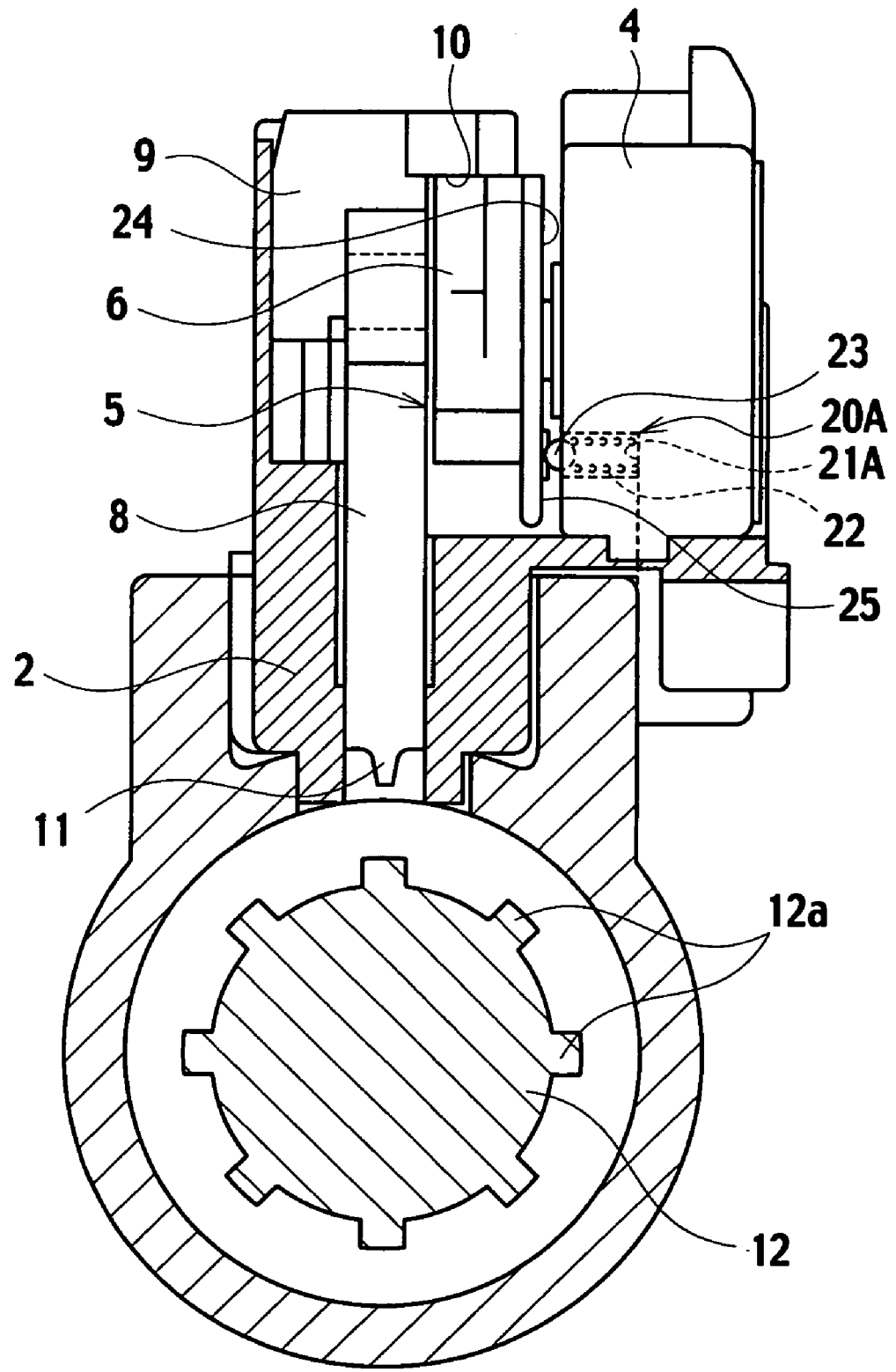
FIG. 9 is a cross section when the locking shaft is in an unlocking position, showing a modification of the steering lock preventing unit of the embodiment.
Figure 10:
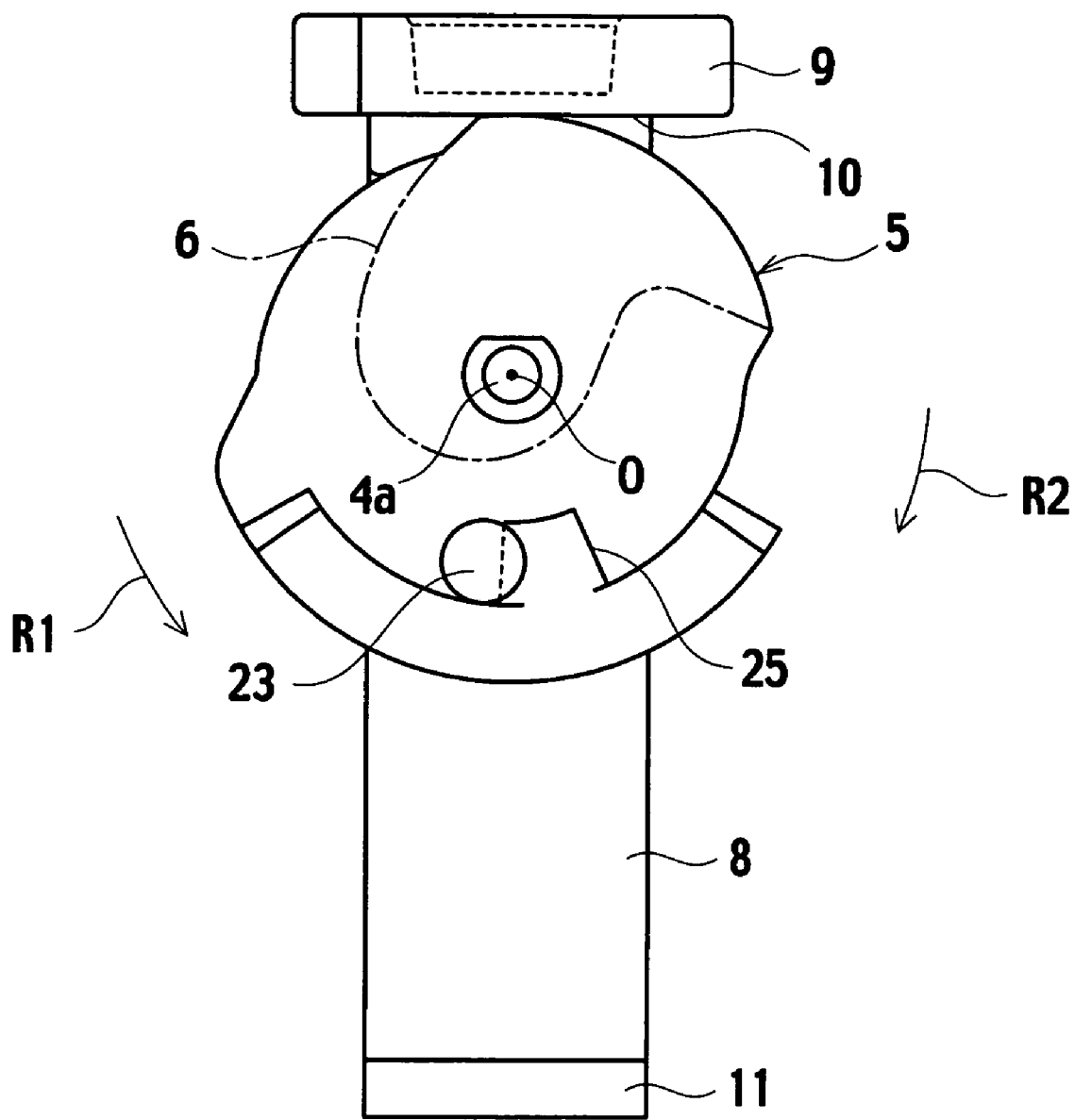
FIG. 10 is a schematic enlarged view of a layout of the locking shaft and a cam plate in the unlocking position, showing the modification of the steering lock preventing unit of the embodiment.

FIGS. 9 and 10 show a modification of the steering lock preventing unit of the embodiment. FIG. 9 is a cross section when the locking shaft 8 is located in the unlocking position. FIG. 10 is a schematic enlarged view showing a layout of the locking shaft 8 and the cam plate 5 in the unlocking position.

According to a steering lock preventing unit 20A of this modification, positions of the ball 23 and the projecting wall 25 are set reversely as compared with the embodiment. That is, the steering lock preventing unit 20A includes the spring 22 disposed in the recess 21 formed in a side surface of the motor unit 4, the ball 23 which is a moving member supported by a tip end of the spring 22, and the projecting wall 25 which is a resisting unit projecting on the moving surface 24. The moving surface 24 is a side surface of the cam plate 5 opposed to a side surface of the motor unit 4.

In FIGS. 9 and 10, like reference numerals denote like parts as those according to the embodiment, and redundant explanation is omitted.

From this modification also, the same effect as that of the embodiment can be obtained.

Figure 11:
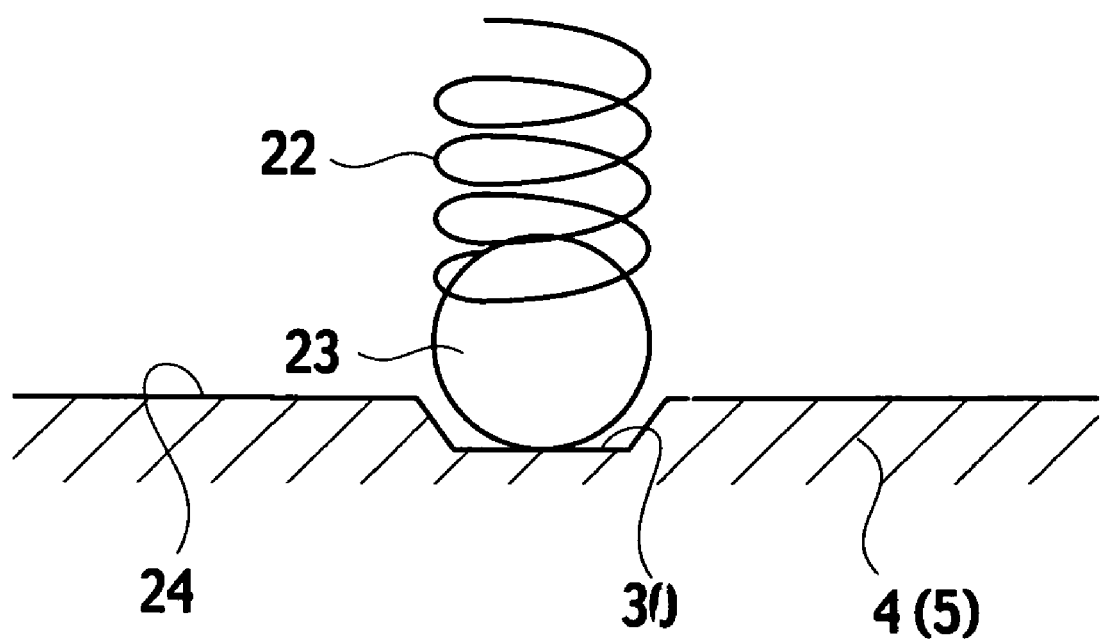
FIG. 11 is a cross section of relevant parts taken along a moving surface, showing the modification of the steering lock preventing unit of the embodiment.

FIG. 11 is a cross section of relevant parts taken along a moving surface, showing a modification of the resisting unit of the embodiment. In this modification, the resisting unit includes a groove 30 formed in the moving surface 24 of the motor unit 4 or the cam plate 5. The groove 30 is formed in the unlocking position. In the unlocking position of the cam plate 5, the ball 23 enters into the groove 30 so that the moving resistance when the ball 23 moves toward the locking position is increased.

Even when the resisting unit is the groove 30 as in this modification, the same effect as that of the embodiment can be obtained.

In the above embodiment and its modifications, the moving member is the ball 23 which is biased by the spring 22 which is a biasing unit. Therefore, the ball 23 smoothly moves on the moving surface 24 and thus, the wear of the moving surface 24 can be prevented as much as possible. The moving member may move on the moving surface 24 by sliding motion or rolling motion by a driving force of the motor unit 4. One of the cam member and a member which is opposed to the cam member may be integrally formed with a leaf spring having a projection, the projection may not slide on a place other than the resisting unit of the steering lock preventing unit 20A, and the projection may abut in the position of the resisting unit.

The invention claimed is:

1. An electric steering locking apparatus comprising:
   an electric drive source having a wall;
   a cam plate that is arranged oppositely to the wall of the electric drive source and rotates in an unlocking direction and a locking direction by driving operation of the electric drive source;
   a locking member that moves between a locking position where a steering shaft is prevented from rotating and an unlocking position where the steering shaft is permitted to rotate by rotation of the cam plate; and
   a steering lock preventing unit that holds the locking member in the unlocking position,
   wherein the steering lock preventing unit comprises a moving member that is movable on a moving locus on one of a side surface of the cam plate and a side surface of the wall of the electric drive source and that is moved by rotation of the cam plate, and a resisting unit that is provided on the other member and that increases a resistance to the movement of the moving member when the moving member moves from an unlocking position to a locking position on the moving locus of the moving member;
   wherein the resisting unit has the resistance so that the moving member can cross over the resisting unit by a driving force of the electric drive source and cannot cross over the resisting unit by vibration during running of a vehicle.

2. The electric steering locking apparatus according to claim 1, wherein the moving member comprises a ball biased toward the opposed member by a biasing unit.

3. The electric steering locking apparatus according to claim 1, wherein the resisting unit comprises a projecting wall provided at a position before the unlocking position on a moving locus.

4. The electric steering locking apparatus according to claim 1, wherein the resisting unit comprises a groove formed in the unlocking position on a moving locus.

5. The electric steering locking apparatus according to claim 1, wherein the electric drive source comprises a motor unit that rotates the cam plate in the unlocking direction and the locking direction.

* * * * *